UNITED STATES PATENT OFFICE.

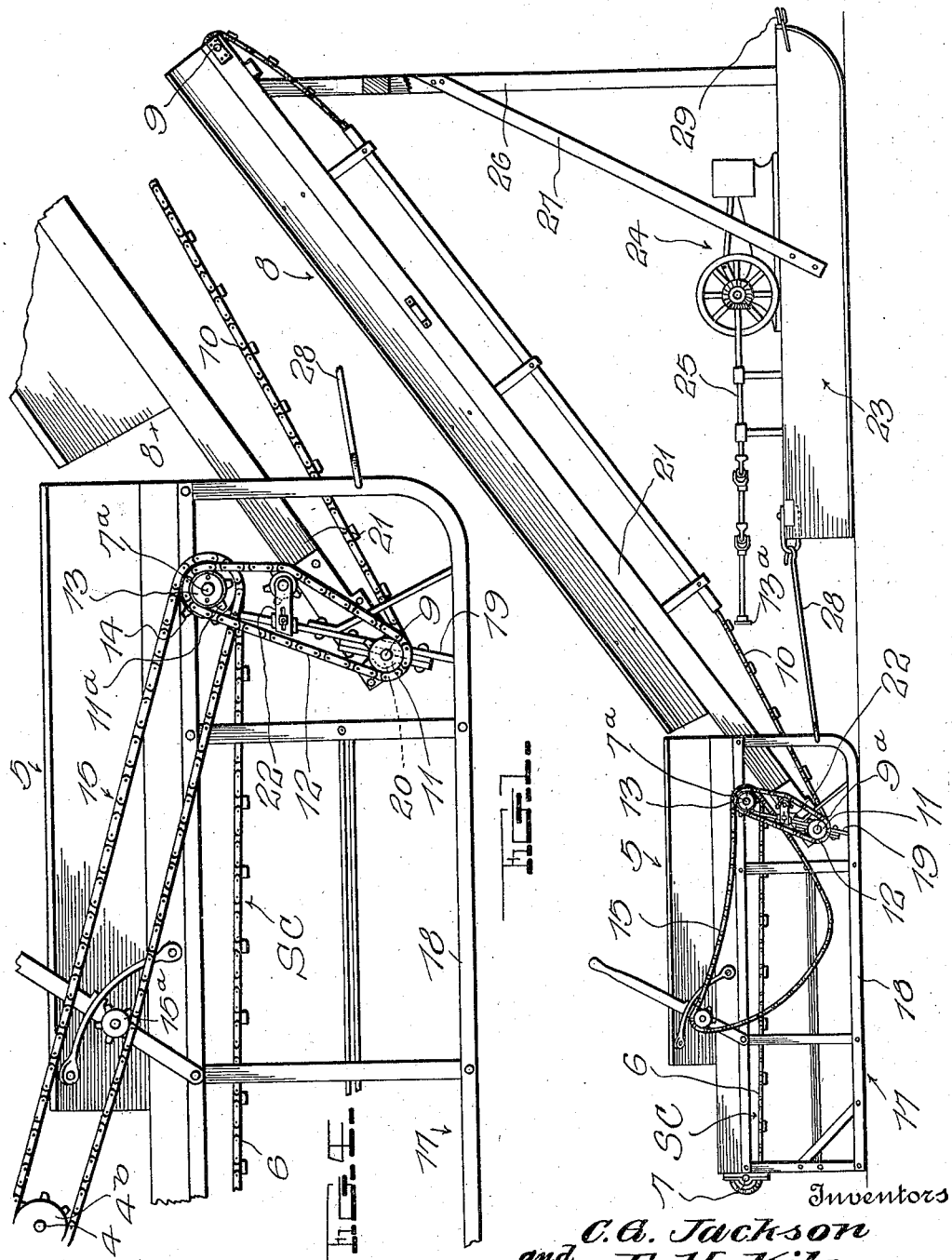

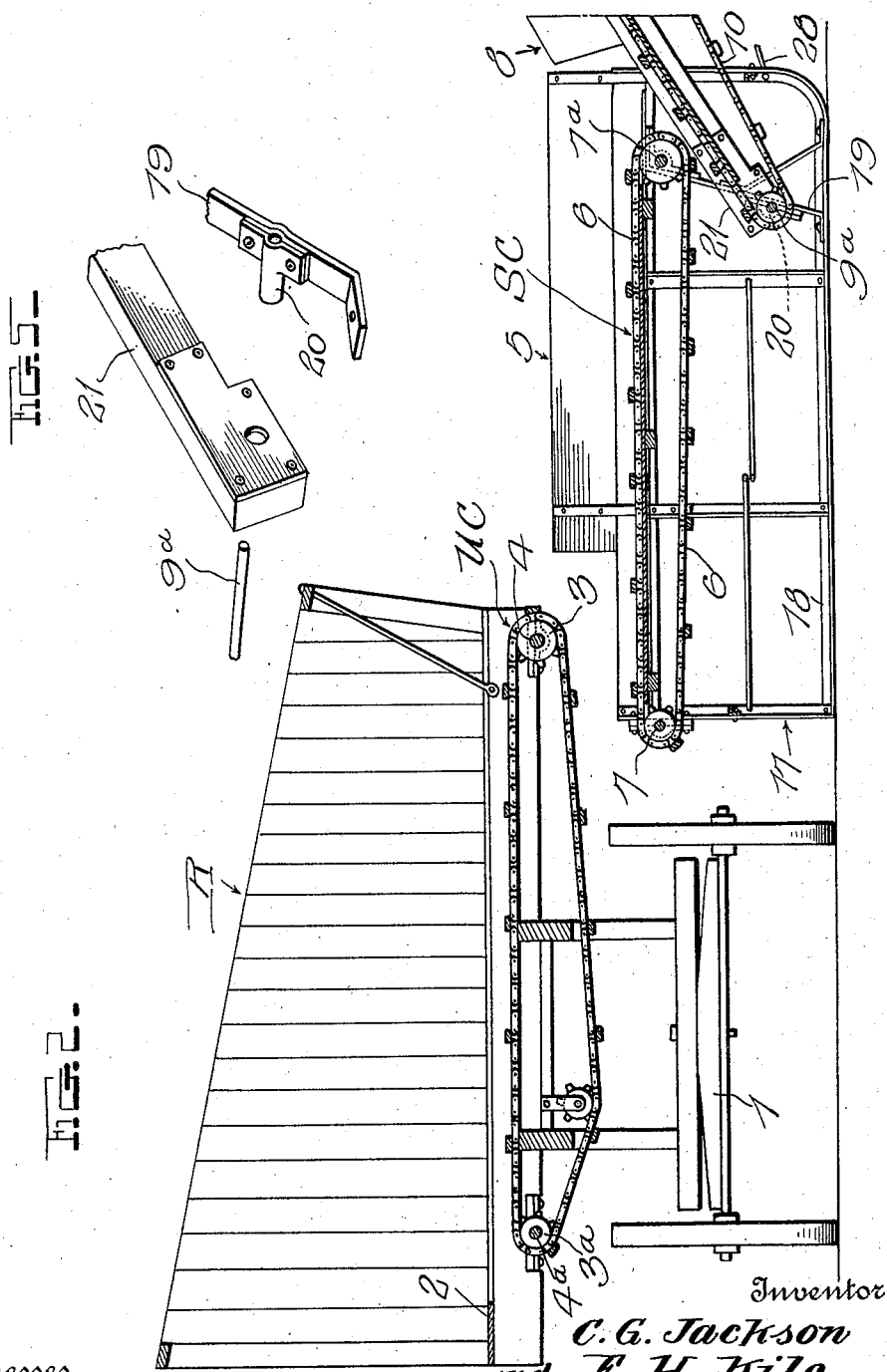

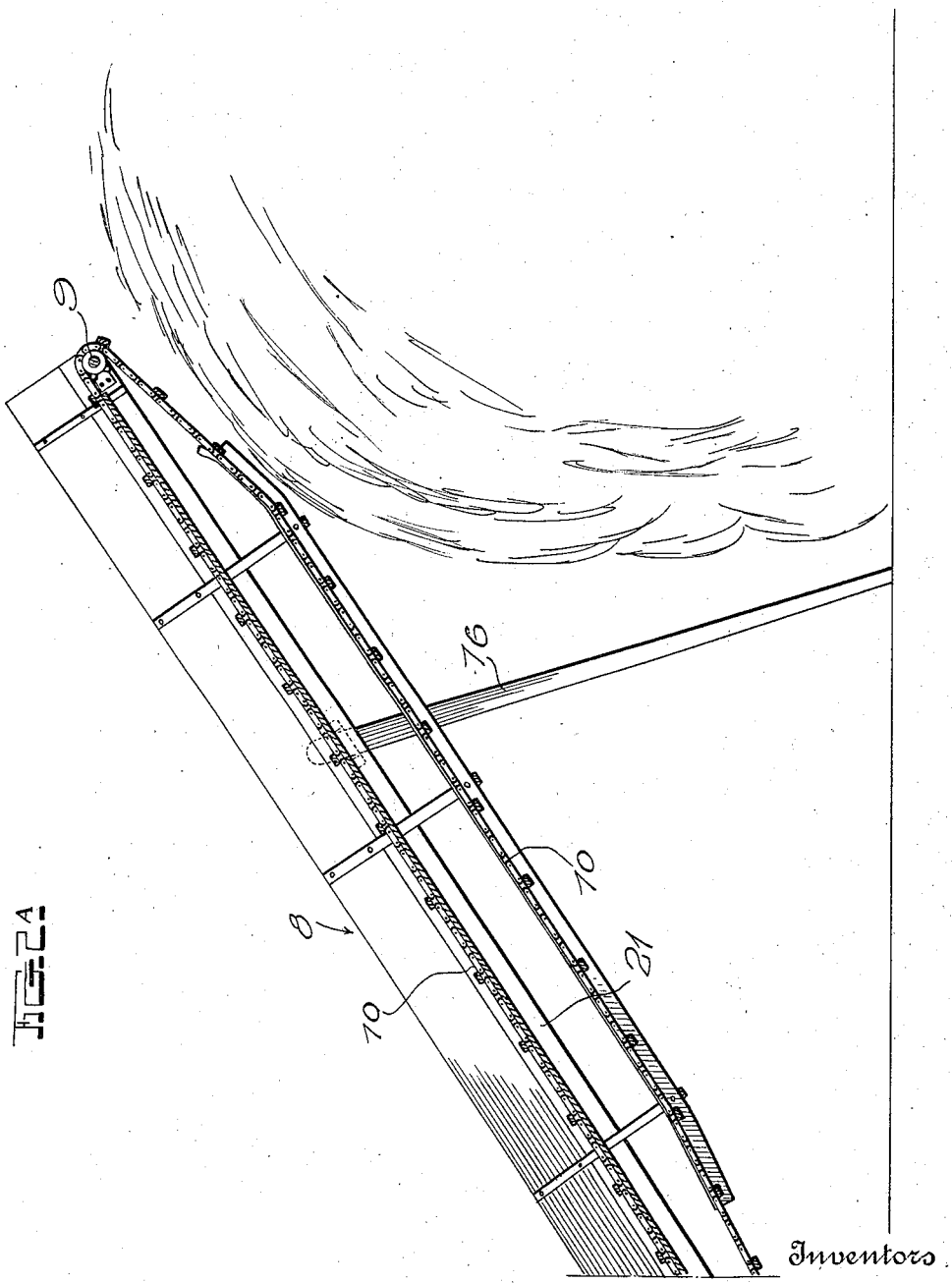

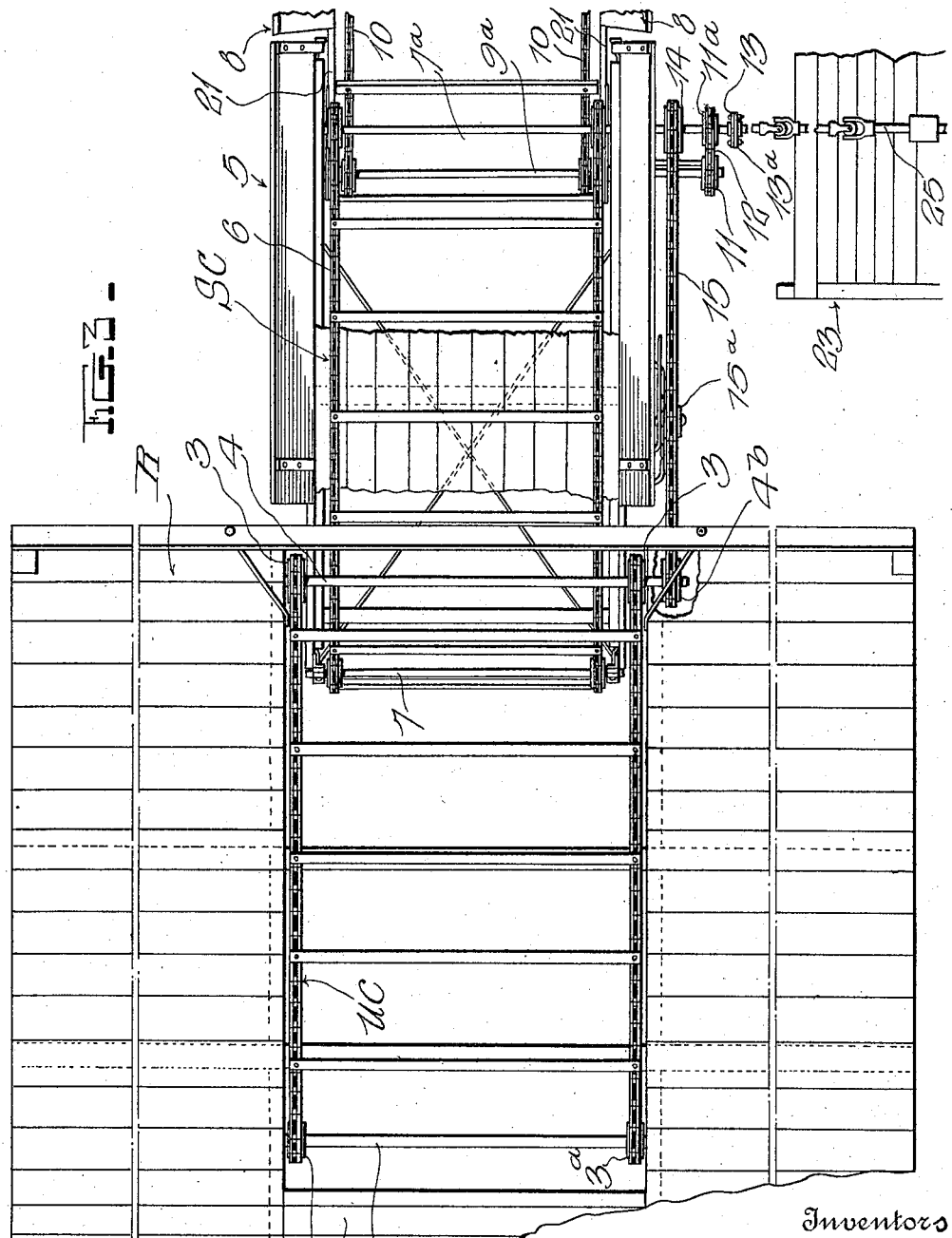

CONGRAVE G. JACKSON, OF ALVA, AND ELMER H. KILE, OF NEAR DANE, OKLAHOMA.

UNLOADER AND STACKER FOR WHEAT AND THE LIKE.

1,179,320. Specification of Letters Patent. Patented Apr. 11, 1916.

Application filed June 3, 1915. Serial No. 31,891.

*To all whom it may concern:*

Be it known that we, CONGRAVE G. JACKSON, a citizen of the United States, residing at Alva, in the county of Woods, State of Oklahoma, and ELMER H. KILE, a citizen of the United States, residing near Dane, in the county of Major and State of Oklahoma, have invented certain new and useful Improvements in Unloaders and Stackers for Wheat and the like; and I do declare the following to be a full, clear, and exact description of the invention, such as will enable others skilled in the art to which it appertains to make and use the same.

Our invention relates broadly to improvements in machines for the handling of unthreshed grain and the like, and more particularly to a combination of parts including a rack for transporting the material from the field to a point at which it is stacked, an unloading conveyer on the rack, a stacking conveyer mounted independently of the rack, driving means for one conveyer, and releasable driving means leading from the latter to the other conveyer, whereby the grain, hay or the like, may be conveyed from the field to such a point as to aline its conveyer with the stacking conveyer, whereupon the two are connected and driven by the single power plant, thereby delivering the load from the rack onto the stacking conveyer, the latter now piling the material in a stack of the desired height.

The object of the invention is to provide a machine for the attainment of the above results, which although being comparatively simple and inexpensive, will be efficient in operation and will possess a number of advantageous characteristics.

With this general object in view, the invention resides in certain unique combinations of parts and in novel details of construction to be hereinafter fully claimed and described by reference to the accompanying drawings wherein:—

Figure 1 is a side elevation of the stacking conveyer showing the same in position for transportation; Figs. 2—2$^a$ is a central vertical longitudinal section through the stacking conveyer and a transverse section through the rack delivering thereonto; Fig. 3 is a top plan view of a portion of the rack and conveyer; Fig. 4 is an enlarged side elevation of one end of the stacking conveyer; and Fig. 5 is a perspective view of structural details to be described.

In referring to the accompanying drawings which constitute a part of the application, similar reference characters will be employed, designating corresponding parts throughout the several views, R relating broadly to a portable rack having an unloading conveyer UC, while SC designates the stacking conveyer broadly.

The rack R is shown in the present application as being supported upon an appropriate truck 1 and as having the conveyer UC disposed transversely of its bottom 2, said bottom being provided with an opening beneath which the conveyer is disposed. Although the conveyer in question might be in any one of a number of forms, it is preferably of the apron type passing around sprocket wheels 3 and 3$^a$ carried respectively by a pair of spaced parallel longitudinally extending shafts 4 and 4$^a$, the shaft 4 being provided on one end with a sprocket wheel 4$^b$ by means of which the conveyer UC is driven in a manner yet to be set forth.

The stacking conveyer SC comprises a fixed conveyer frame 5 having the endless belt conveyer 6 passed around sprockets carried by the transverse shafts 7 and 7$^a$, and a vertically swinging inclined section 8 having respectively at its upper and lower ends transverse shafts 9 and 9$^a$, such shafts carrying sprockets around which the endless apron 10 passes, this apron being so disposed as to receive thereon material conveyed from the rack R by the apron 6.

The shafts 7$^a$ and 9$^a$ which are shown in the present application as disposed approximately in vertical alinement, are provided respectively with sprocket wheels 11 and 11$^a$ around which a sprocket chain 12 is passed, while one of these shafts, preferably the shaft 7$^a$, is extended and provided on one end with a coupling member 13 for the attachment of a driven shaft yet to be described, while likewise carried by said shaft 7$^a$ is an additional sproket 14 around which the sprocket chain 15 is passed, said chain being likewise passed around the sprocket 4$^b$ on the shaft 4 when the rack is properly positioned in respect to the apron 6 of the stacking conveyer, it being evident that driving of the shaft 7$^a$ will simultaneously actuate the endless apron conveyer UC and the two endless aprons 6 and 10 of the stacking conveyer SC, thereby quickly and expeditiously unloading the contents of the rack R and delivering the same from the elevated free end of the conveyer section 8, this section being supported, when in use, upon a pair of detachable legs 16 (see Fig. 2ª). When, however, the conveyer SC is to be transported from place to place, these legs are removed and a truck to be described supports the vertically movable section 8 of said conveyer. Coacting with the truck just mentioned, is a permanent truck 17 disposed beneath the rigid section 5 of the stacking conveyer, such truck being shown in the present embodiment of the invention in the form of a pair of suitably constructed runners 18 whose front ends carry substantially upright standard members 19 having thereon the alined tubular journals 20 which extend inwardly toward each other through alined openings formed in the lower ends of the side bars 21 of the movable section 8, the shaft 9ª being rotatably mounted in the tubular journals 20, whereby the latter act not only as means pivotally anchoring the lower ends of the bars 21, but as bearings for said shaft. This is a rather unique feature of construction, since the weight of the conveyer section 8 will not cause unnecessary friction and wear on the shaft 9ª as would otherwise occur.

In addition to the details just described as associated with the standards 19, an appropriate type of chain tightener 22 is preferably adjustably secured to one of said standards for the purpose of compensating for slack in the chain 12 and thereby insuring the best results.

Spaced in advance of the truck 17 when the stacking conveyer is being transported from place to place, is the detachable truck 23 also shown in the form of a pair of skids or runners supporting thereon a power plant 24 which is preferably in the form of a gasolene engine and which drives a shaft 25 having on its free end a coupling member 13ª which, when the machine is in operation, interengages the member 13 and thus transmits power from the engine 24 to the two conveyers, it being evident from the drawings, however, that the truck 23 is shifted from its position in advance of the truck 17 to a point spaced to one side of the latter. The truck 23 carries, in addition to the parts previously described, an upright frame structure 26 braced at 27 and supporting thereon the vertically swinging conveyer section 8, when all parts of the machine are disposed for transportation as disclosed in Fig. 1.

With the parts so related, the two trucks 17 and 23 are detachably connected by hooks or the like 28 and the front truck 23 is then coupled by any appropriate draft appliance such as that indicated at 29, either to a tractor or the like, or to a double tree drawn by draft animals. Thus it will be seen that the entire stacking conveyer SC may be readily moved from one place to another, yet that when the destination is reached, the truck 23 may be easily replaced by the legs 16, after which said truck is shifted to the position disclosed in Fig. 3, whereupon coupling of the two members 13 and 13ª will allow the power plant 24 to drive the two endless aprons of said conveyer, as well as the unloading conveyer UC carried by the rack R, when the latter is driven to a point opposite the rear end of the apron 6 and when the chain 15 is applied to the sprocket 4ᵇ and tightened by the lever actuated idler 15ª or an equivalent device. By this operation of parts, the rack may be quickly and easily unloaded and the contents thereof delivered from the upper end of the apron 10 and thereby stacked.

From the foregoing description taken in connection with the accompanying drawings, it will be evident that although very simple and inexpensive construction has been provided for the attainment of the desired end, the complete machine will be very efficient in operation and will possess a number of advantageous characteristics.

In the drawings, certain specific details of construction have been shown for accomplishing probably the best results, and in the preceding, such details have been described, but it will be evident that we need not be restricted thereto otherwise than to the extent to which the appended claims limit us.

We claim:

1. A portable unloading machine comprising front and rear trucks, the former being adapted to be drawn forwardly, a horizontal conveyer on the rear truck adapted to receive material from a wagon or the like, a detachable draft connection between the two trucks, a rigidly fixed stand rising from the front end of the front truck and composed of a pair of spaced upright standards, an engine mounted on said front truck in rear of the stand and having a flexible shaft, an upwardly and forwardly inclined conveyer pivoted at its rear end to the rear truck below the front end of the horizontal conveyer, the front end of said inclined conveyer resting on the upper ends of the standards of the aforesaid stand but being disconnected therewith, a shaft for driving both conveyers, a coupling on said shaft, and an additional coupling secured to the flexible shaft of the engine, the front truck being adapted to be detached and to be so positioned as to allow the two couplings to be conected when the machine is to be used.

2. An unloading machine comprising a horizontal conveyer frame, a pair of parallel runners spaced beneath and supporting said frame, a pair of upwardly and forwardly inclined bars secured at their lower ends to the front end portions of the runners and at their upper ends to said conveyer frame to brace said frame and runners relatively, a second conveyer frame inclining upwardly and forwardly from the intermediate portions of said bars and having alined openings formed through the lower ends of its side bars, and tubular journals received in said openings and rigidly secured to the intermediate portions of said bars, whereby the latter also serve as supports for the lower end of the inclined conveyer; in combination with endless belt conveyers in the two frames, the lower shaft of the conveyer of the inclined frame being mounted rotatably in the aforesaid tubular journals.

In testimony whereof we have hereunto set our hands in presence of two subscribing witnesses.

CON. G. JACKSON.
ELMER H. KILE.

Witnesses:
MILTON W. STRAWN,
SANDOR J. VIGG.

Copies of this patent may be obtained for five cents each, by addressing the "Commissioner of Patents, Washington, D. C."